United States Patent
Cohen et al.

[11] Patent Number: 5,631,991
[45] Date of Patent: May 20, 1997

[54] PLASTIC OPTICAL SUBASSEMBLIES FOR LIGHT TRANSFER BETWEEN AN OPTICAL FIBER AND AN OPTOELECTRONIC CONVERTER AND THE FABRICATION OF SUCH PLASTIC OPTICAL SUBASSEMBLIES

[75] Inventors: Mitchell S. Cohen, Millwood; Glen W. Johnson, Yorktown Heights; Jeannine M. Trewhella, Peekskill, all of N.Y.

[73] Assignee: International Business Machines Corporation, Armonk, N.Y.

[21] Appl. No.: 592,279

[22] Filed: Jan. 26, 1996

[51] Int. Cl.$^6$ .............................. G02B 6/00; G02B 6/255
[52] U.S. Cl. ................................................................ 385/93
[58] Field of Search ................................. 385/88–93, 147

[56] References Cited

U.S. PATENT DOCUMENTS

| | | | |
|---|---|---|---|
| 4,385,800 | 5/1983 | Basola et al. | 385/88 |
| 4,616,899 | 10/1986 | Schlafer | 385/88 |
| 4,733,932 | 3/1988 | Frenkel et al. | 385/92 |
| 4,786,135 | 11/1988 | Boero | 385/100 |
| 4,875,215 | 10/1989 | Hughes | 372/6 |
| 5,011,247 | 4/1991 | Boudreau et al. | 385/88 |
| 5,011,254 | 4/1991 | Edwards et al. | 385/33 |
| 5,029,965 | 7/1991 | Tan | 385/88 |
| 5,040,886 | 8/1991 | Gunter | 359/372 |
| 5,073,047 | 12/1991 | Suzuki et al. | 385/93 |
| 5,093,878 | 3/1992 | Haley et al. | 385/92 |
| 5,181,265 | 1/1993 | Nishiwaki et al. | 385/33 |
| 5,247,595 | 9/1993 | Földi | 385/78 |
| 5,256,851 | 10/1993 | Presby | 219/121.69 |
| 5,265,177 | 11/1993 | Cho et al. | 385/14 |
| 5,278,929 | 1/1994 | Tanisawa et al. | 385/93 |
| 5,333,224 | 7/1994 | Kikuchi | 385/93 |
| 5,351,330 | 9/1994 | Jongewaard | 385/93 |
| 5,353,294 | 10/1994 | Shigeno | 372/43 |
| 5,396,571 | 3/1995 | Saadatmanesh et al. | 385/33 |
| 5,402,510 | 3/1995 | Kalonji et al. | 385/33 |
| 5,416,869 | 5/1995 | Yashino | 385/88 |
| 5,436,990 | 7/1995 | Head et al. | 385/34 |

FOREIGN PATENT DOCUMENTS

| | | |
|---|---|---|
| 56-46203 | 4/1981 | Japan. |
| 60-64313 | 4/1985 | Japan. |
| 62-81614 | 4/1987 | Japan. |
| 4-114117 | 4/1992 | Japan. |

OTHER PUBLICATIONS

Johnson, et al., "Connectorized Optical Link Package Incorporating a Microlens", Conference Proceedings of the 30th Electronics Components Conference, Apr. 1980, pp. 279–282.

Nolan, et al., "Plastic Optical Sub-Assembly", IBM Technical Disclosure Bulletin, V34 N7B, Dec. 1991, p. 230.

Kato, et al., "Low-Loss Laser Diode Module Using a Molded Aspheric Glass Lens", IEEE Photonics Technology Letters, V2 N7, Jul. 1990, pp. 473–474.

*Primary Examiner*—Akm E. Ullah
*Attorney, Agent, or Firm*—Whitham, Curtis, Whitham & McGinn; Robert P. Tassinari, Jr.

[57] ABSTRACT

A method for providing X,Y and Z alignment during fabrication of an optical subassembly (OSA) by active alignment and fixing with epoxy through the agency of radio frequency (RF) heating in order to provide acceptable feedback-induced noise level along with acceptable coupling efficiency.

16 Claims, 2 Drawing Sheets

PLASTIC OPTICAL SUBASSEMBLIES FOR LIGHT TRANSFER BETWEEN AN OPTICAL FIBER AND AN OPTOELECTRONIC CONVERTER AND THE FABRICATION OF SUCH PLASTIC OPTICAL SUBASSEMBLIES

CROSS-REFERENCE TO RELATED APPLICATION

The invention described in this application is related in subject matter to patent application Ser. No. 08/322,849 filed Oct. 13, 1994 now U.S. Pat. No. 5,511,140, by Michael F. Cina, Mitchell S. Cohen, Glen W. Johnson, Modest M. Oprysko, and J. M. Trewhella for "Molded Plastic Optical Fiber-Optoelectronic Converter Subassembly" and assigned to a common assignee with this application. The disclosure of patent application Ser. No. 08/322,849 now U.S. Pat. No. 5,511,140 is incorporated herein by reference.

DESCRIPTION

Background of the Invention

1. Field of the Invention

The present invention generally relates to subassemblies that transfer light between an optical fiber and an optoelectronic converter and, more particularly, to the construction of such subassemblies made of molded plastic material.

2. Description of the Related Art

The efficiency of an optical fiber as a signal transmission conduit is affected by the precision in transferring the light between an optical fiber and an optoelectronic converter such as a photodetector or laser that converts light signals to electrical signals or vice versa. The alignment tolerances are very small, thus requiring housings that can maintain precision alignment in service.

The simplest optical subassembly arrangement is to butt the face of the optical fiber to the optoelectronic converter, commonly known as butt coupling. However, in this arrangement, the efficiency is so low as to restrict the uses. The use of small lenses has been employed to accommodate the light radiation and reception patterns of the optical fibers and the optoelectronic converters. See J. G. Ackenhausen, "Microlenses to Improve LED-to-Fiber Optical Coupling and Alignment Tolerance", *Applied Optics*, Vol. 18, Nov. 21, 1979.

Many optoelectronic conversion subassemblies include arrangements wherein a housing supplies rigid alignment among the optical fiber, the lens, and the optoelectronic converter. This type of subassembly was described by Kato et al. in "Low-Loss Laser Diode Module Using a Molded Aspheric Glass Lens", *IEEE Photonics Technology Letters*, Vol. 2, pp. 473–474, July 1990. These optical subassemblies (OSAs), however, require carefully selected materials for the housings and the lenses for both optical performance and mechanical stability in addition to being able to withstand high temperatures while the parts are permanently attached or fixed in position during the alignment steps of the assembly process. High precision machining of the housings is required to produce locating surfaces that allow components to be properly aligned. Furthermore, polished glass lenses are required. In addition, intricate alignment operations in three dimensions are necessary to achieve good power transfer.

To reduce manufacturing costs, some have tried to use molded plastic in OSAs as described in *IBM Technical Disclosure Bulletin*, Vol. 34, No. 7B, p. 230, Dec. 1991. Further, U.S. Pat. No. 4,616,899 describes an optoelectronic subassembly arranged with a molded plastic housing wherein portions of the housing material serve as lenses.

The previous work in development of the fabrication procedure for plastic OSAs has been based on the assumption that there could be no adjustment of the laser with respect to the housing along the optical (Z) axis, and that only lateral (X,Y) adjustments were permitted. Such a housing and procedure was described in patent application Ser. No. 08/322,849 now U.S. Pat. No. 5,511,140, referenced above. Typically, a "TO can" of the type used earlier in semiconductor-chip packaging is used with the addition of a transparent glass window to provide hermetic sealing of a laser chip. The mounting of the laser chip within this package is somewhat imprecise. For this reason, the laser was aligned and fixed at the "zero" position when the laser and its housing were attached. Also, the lens was specially designed to provide a Z-position tolerance, i.e., a laser housing tolerance, which was demanded by variations in laser position within its own package. Other Z-axis variations include those associated with lens and housing dimensions, and in fixing the lens to the housing.

This fabrication-procedure assumption was based on earlier work which showed that displacements caused by the shrinking of the epoxy during cure did not permit reproducible results when Z-alignment procedures were attempted. However, recent work has given high motivation for controlling the Z-position (i.e., laser-housing spacing). Achievement of the desired trade-off between feedback-induced noise and coupling efficiency (CE) can be obtained by using various housings fabricated so that the lens-laser distance is fixed at the desired value using, for example, a housing with a "recess" so the Z-value is changed from that associated with optimum coupling efficiency, but such a procedure places high demands on the tolerances of the components and requires stocking of several different housings if a range of coupling efficiencies is required. A procedure which permitted Z-axis alignment would not only relax these constraints because any desired Z value (laser-housing spacing) could be achieved during alignment, but would remove the need for providing large Z-axis positioning tolerances in the lens design, so that this degree of freedom could be used in designing for reduced feedback-induced noise and higher coupling efficiency.

In light of the foregoing, there exists a need for an optical subassembly that requires relaxed mechanical tolerances, greater flexibility in material selection and alignment along all three axes to achieve an inexpensive but nonetheless functional and durable assembly. The motivation for Z control lies in the fact that many lasers are prone to optical feedback-induced noise; i.e., noise induced by reflections from various optical surfaces. It is known (D. M. Byrne et al., *IEEE Tech. Lett* 3, pp. 891–894, 1991) that this noise decreases if the coupling efficiency (CE) is reduced. Such a reduction in CE and consequent reduction in feedback-induced noise is conventionally achieved by choosing a value of Z giving less than the maximum CE; i.e., the Z-position can be used to control the CE/feedback-induced noise tradeoff. For some applications, a tradeoff giving reduced feedback noise at the expense of a lower coupling efficiency can be highly advantageous.

SUMMARY OF THE INVENTION

It is therefore an object of the present invention to provide a method and apparatus for X, Y and Z axis alignment in the manufacture of an optical subassembly that achieves acceptable feedback-induced noise along with acceptable coupling efficiency.

According to the invention, there is provided a process of aligning and fixing in place a packaged solid-state optoelectronic converter, such as a photodetector or laser, with a housing. The housing has a lens firmly mounted therein and is adapted to position a ferrule-held optical fiber. In the practice of the process of the invention, an oversized region of the housing is provided within which a portion of the outside of the packaged solid-state optoelectronic converter fits. The range of motion of the packaged solid-state optoelectronic converter, in two directions perpendicular to the common optical axis and in one direction parallel to the common optical axis, is limited, each direction of motion being limited to approximately ±0.2 mm. The fiber face of the optical fiber of the ferrule-held optical fiber is arranged in a ferrule-accepting bore of the housing. A position fixing adhesive is applied while in its compliant state in the space between the portion of the outside of the packaged solid-state optoelectronic converter and the oversized region of said housing. The packaged solid-state optoelectronic converter is moved within the oversized region, according to an optimization prescription, while monitoring the power level of the optical signal. The movement experienced by said packaged solid state optoelectronic converter is in two directions perpendicular to the common optical axis and in the direction parallel to the common optical axis.

In the practice of the invention, housings with a very large recess were used so that at the "zero" position a very low value of coupling efficiency (and hence very low feedback-induced noise) was obtained. A program was written which caused the alignment apparatus to first carry out an XY alignment, then gradually increase the gap between the laser and the housing until the coupling efficiency had increased to a predetermined value. At this point another XY alignment was performed, followed by the usual curing procedure. Aside from the altered alignment technique, the only difference between the new and the standard procedures involved the use of more epoxy to accommodate the larger gap, and the use of a more aggressive curing procedure to crosslink the added epoxy.

This invention makes possible improved lens designs that take advantage of relaxed constraints permitted by the method and apparatus for X, Y and Z axis alignment. Thus, one advantage of the invention is the possibility of a lens design that achieves a higher value of coupling efficiency for a given feedback-induced noise value.

It is to be understood that both the foregoing general description and the following detailed description are exemplary and explanatory and are intended to provide further understanding of the invention as claimed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In the transferring of optical signals between an optical fiber and an optoelectronic converter, highly precise optical subassemblies (OSAs) are employed to hold the end of the optical fiber in alignment with the optoelectronic converter in such a way that an acceptable power transfer takes place. The optoelectronic converter is a semiconductor device. It converts between light and electrical signals. The optoelectronic converter may be selected to favor a particular direction such as transmission by using a light power projecting laser and it may be selected to favor reception by using a sensitive light responsive diode. Such subassemblies are referred to as transmitting optical subassemblies (TOSAs) and receiving optical subassemblies (ROSAs), respectively.

To meet precision requirements, over ten precisely machined parts of stainless steel and ceramic are used in these OSAs. The alignment operations and the rigid fixing in place of the aligned structural parts (usually by soldering or high power laser welding) are complex and require considerable care to minimize transfer of the damaging heat to the semiconductor optoelectronic converter. A problem encountered in all alignment and fixing operations, whether fixing by epoxy, solder or laser welding, is the shifting of parts during the fixing by the action of the applied heat causing alignment to deteriorate and the coupling efficiency (CE) to be reduced. The alignment apparatus and procedure of the present invention is designed to alleviate or eliminate these alignment problems.

Figure 1:
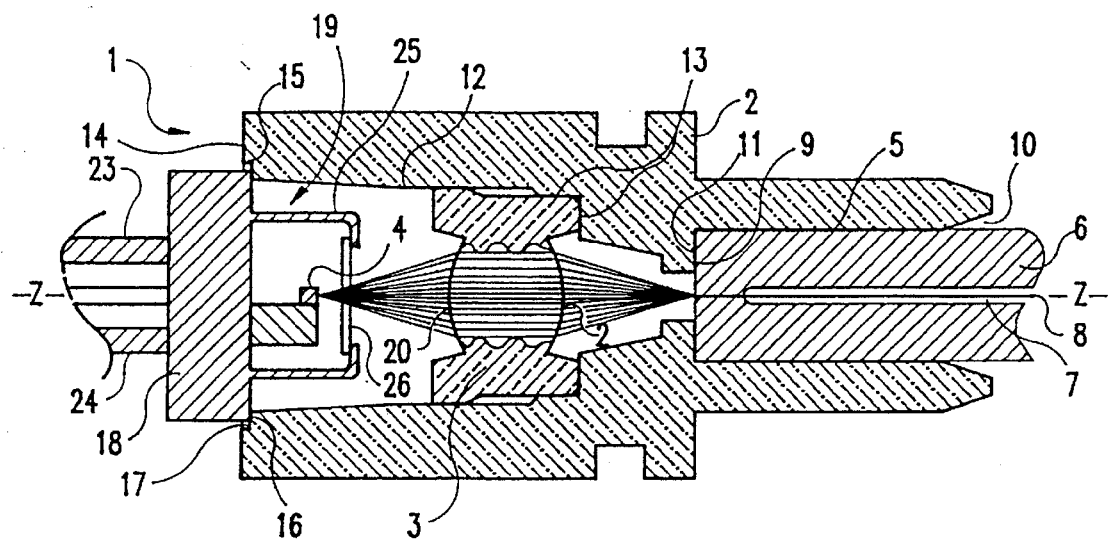
FIG. 1 is a cross-sectional view of the fiber optic plastic optoelectronic converter subassembly of the invention, showing a fiber mounted in a ferrule which in turn is inserted into the receiving bore of the optical subassembly housing.

Referring now to the drawings, and more particularly to FIG. 1, there is shown a subassembly 1 made up of a housing 2, a lens 3 and a supported optoelectronic converter 4. The housing 2 is of injection molded plastic having a high modulus of elasticity for rigidity, a high temperature resistance to withstand the heat of the attachment in alignment, highly accurate moldability to tolerances (on the order of 5 µm) after a postmold bake cycle, and a high wear resistance to be able to withstand multiple optical fiber ferrule insertions and withdrawals. Suitable materials such as poly (aryletherketone) and poly(benzoatenaphthalate), highly filled with such materials as glass or carbon fibers, can be utilized. These materials are known as Vitrex 450CA30, commercially available from ICI, and Vectra 230, sold by Hoechst-Celanese. Generally, materials with a high modulus of elasticity fulfill the requirements.

The housing 2 has several bores all centered on the Z-axis with the dimensional positioning of the shoulders of the bores serving as locating stops. In the housing 2 there is a ferrule bore 5 into which the ferrule 6 of an optical fiber 7 with a signal carrying core 8 is inserted. The ferrule 6 terminates at a face 9. The fiber is mounted in the ferrule so that the face of the fiber is in the face of the ferrule. The ferrule bore 5 has a tapered entrance 10 and a diameter dimension related to the outside diameter of the ferrule 6 so as to retain the optical fiber face 9 against the shoulder 11 in a friction fit. A lens bore 12 with further alignment shoulder and bore 13 is made through the face 14 and provides a precise locating sliding fit for the lens 3 when the peripheral portion of the lens 3 is in the alignment bore and against the shoulder 13. A converter bore 15 into the face 14 provides a shoulder 16 that initially positions the optoelectronic converter 4 along the Z-axis. Compared with the housing described in patent application Ser. No. 08/322,849 now U.S. Pat. No. 5,511,140, referenced above, the shoulder 16 is recessed further (i.e., shifted towards the lens) in order to permit translation of the optoelectronic converter 4 away from the position giving optimum coupling efficiency (CE). A recess from the optimum position of 225 µm was found to be practical.

The optoelectronic converter package 19, in the form of a TO can 25, projects into the lens bore 12, and the disk-shaped support 18 is received within the converter bore 15. The diameter of the converter bore 15 is larger by a clearance 17 than the diameter of the disk-shaped support 18. This allows for the movement required for alignment in the X and Y directions of the optoelectronic converter 4 and permits only a thin layer of epoxy adhesive for use in attaching the aligned disk-shaped support 18 in position.

Figure 2:
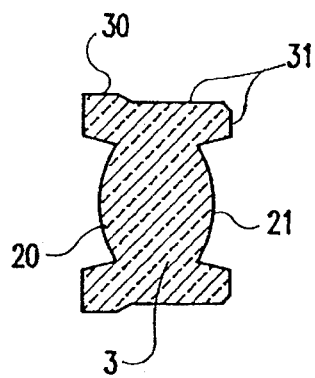
FIG. 2 is a cross-sectional view of the lens in the subassembly of FIG. 1.

The lens 3, also shown in FIG. 2, is an asymmetric lens of molded plastic, such as a polyolefin. The lens 3 is asymmetric in that the lens surfaces 20 and 21 have different optical properties. The lens 3 may have the surface 20 spherical or aspherical, and the surface 21 aspherical. Alternatively, lens 3 may have the surface 21 spherical or aspherical and the surface 20 aspherical.

The surface 20 near the optoelectronic converter 4 is focused on the photoresponsive location of the optoelectronic converter 4 and substantially collimates the light passing through the lens 3 to the opposite face 21. The distance, or center thickness on the Z-axis between the faces 20 and 21 is very nearly the same from lens to lens when molded.

The disk-shaped support 18 has radio frequency (RF) susceptibility so that attachment or fixing can be accomplished by gentle heating right at the intersection of the parts. This arrangement permits very rapid heating of the interfaces to be joined and any intervening epoxy layer.

Alignment in the X-Y plane takes place with the optoelectronic converter 4 being powered through the various conductors such as conductors 23 and 24. The amount of light transferred through the subassembly is monitored through the core 8 of the optical fiber 7 by, in the case of a transmitting optical subassembly (TOSA), a detector at the far end of the optical fiber and, in the case of a receiving optical subassembly (ROSA), by monitoring the intercepted power at the optoelectronic converter 4 of the light delivered by the optical fiber 7.

The support 18 is moved in the X-Y direction (the X direction being perpendicular to the page and the Y direction being in the plane of the page) within the clearance 17, with the surface on which the TO can 25 is mounted being against the shoulder 16. When the optimum power is transferred, RF produced heat coupled as a result of the susceptor properties of the support 18 and the cylindrical TO can 25, cures the small quantity of epoxy and fixes the optoelectronic converter 4 in position. The cylindrical TO can 25, with window 26, provides a hermetic package for the optoelectronic converter 4.

Referring again to FIG. 2, the lens 3 is of molded plastic with at least the lens face portions circularly symmetric around the Z-axis line and with the peripheral surface portion 30 that bears on and is a sliding fit with no distortion into the bore 12 of FIG. 1 parallel with the Z-axis. The peripheral surface portion has an alignment and stop portion 31 that serves, when in contact with the alignment bore and shoulder 13 of FIG. 1, to position the lens 3. The lens surfaces 20 and 21 perform different optical functions. In the preferred embodiment where the surfaces 20 and 21 are aspherical, the surface 20, that is to be near to the optoelectronic converter 4 of FIG. 1, focuses on the optoelectronic converter 4 and substantially collimates the light between the surfaces 20 and 21. The surface 21 has deliberately introduced longitudinal spherical aberration that produces a focus range adjacent to the face of the optical fiber 7.

The lens 3 is retained, without distortion, in the bore 12 against the stop 13 by moving some material of the plastic housing 2 against the lens 3 in an operation known as staking. In the preferred embodiment, the staking operation is performed by using a cylinder having an outside diameter slightly larger than the interior of bore 12. The edge at one end of the cylinder is sharp. The staking operation is performed by heating the sharp edge of the cylinder and quickly driving it into the bore 12 causing a thin roll of the housing material to be forced against the exposed peripheral edge of the lens 3. This is a highly effective and yet very inexpensive method of securing the lens 3 within the housing 2.

The procedure for designing the lens is lengthy, and depends upon the exact design tolerances required. For design details see U.S. application Ser. No. 08/322,849 now U.S. Pat. No. 5,511,140.

Referring again to FIG. 1, the bore 15 in the face 14 of the housing 2 permits the support 18 for the optoelectronic converter 4 to move in all three (X, Y and Z) directions. The bore 15 is larger than the diameter of the support member 18 of the optoelectronic converter package 19 by a clearance 17, of the order of 200 µm, which permits X, Y or Z movement of the member 18 as much as 100 µm and also accommodates only a thin layer of epoxy resin adhesive that is to be used to attach the support member 18 to the housing 2 at the alignment point of optimized light transfer between the optoelectronic converter 4 and the optical fiber 7.

There are a number of considerations involved in the attachment. The semiconductor optoelectronic converter 4 is sensitive to heat and easily damaged in metal flow type of attachment, as conventionally practiced. The epoxy resin is compatible with the plastic structure and is cured in a short time at an elevated temperature, but at a significantly lower temperature than used in metal flow methods. The epoxy resin, however, shrinks on curing. In optical subassemblies, only very small misalignment can be tolerated, for example about 7 µm for a multimode fiber. The advantages of epoxy can be gained only if the position of the optoelectronic converter is controlled after fixing and curing to keep the movement due to shrinkage within the tolerable amount.

In the structure of the invention, a thin layer of epoxy is placed around the support 18. By inductively coupling radio frequency (RF) power into the optoelectronic converter package 19 primarily through its support 18, the rate at which the temperature of the optoelectronic converter package 19 rises and the time that it is held at an elevated temperature are precisely controlled. Since the support 18 is in intimate contact with the epoxy, the curing of the epoxy is accomplished under highly controlled conditions.

During alignment, the optoelectronic converter 4 is powered through a plurality of conductors, represented in FIG. 1 by conductors 23 and 24. The light from or to the optoelectronic converter 4 passes through the lens 3 and the corresponding signal is monitored. Through movement of the support 18 and optoelectronic converter assembly in the clearance 17, optimal coupling is achieved when the amount of light reaching the detector reaches a predetermined value.

Figure 3:
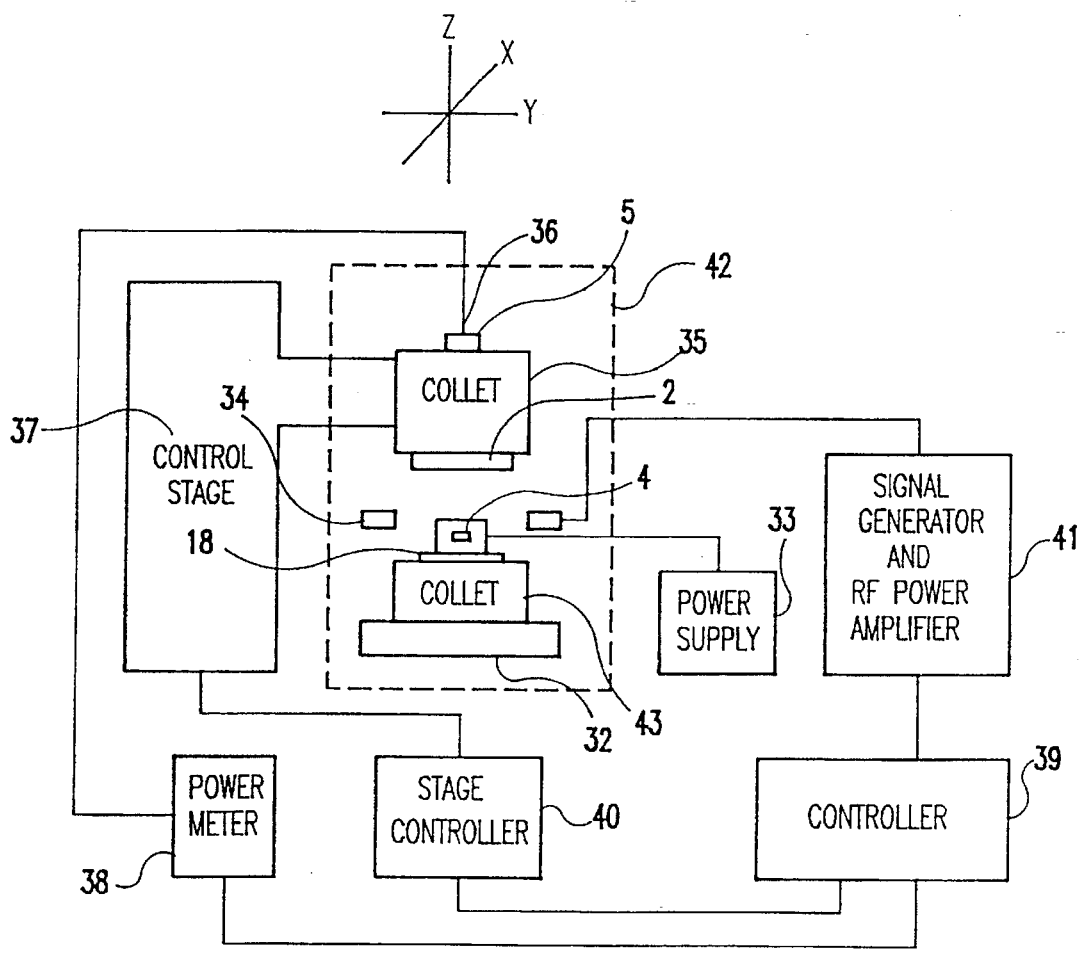
FIG. 3 is a functional block diagram of an apparatus for optoelectronic converter alignment and attachment of the optoelectronic converter.

Referring to FIG. 3 a block diagram of an alignment apparatus is provided comprising a work station 42. A lower collet stage 43 on a workstation pedestal 32 grips the support member 18 (FIG. 1) of the optoelectronic converter package 19 (FIG. 1) and with the optoelectronic converter 4 being powered from a supply 33. An RF coil assembly 34 surrounds the optoelectronic converter package 19. This assembly includes a horse shoe shaped ferrite block which concentrates the RF field. An upper collet 35 shown separated in the Z-direction for visibility, grips the housing 2 containing the lens 3 and having a fiber optic ferrule 36 plugged into the bore 5 of the housing 2. The upper collet 35 is controlled for movement in the X, Y and Z directions by a control stage 37. Alternatively, the upper collet 35 can be controlled in the Z-direction and the lower collet stage 43 can provide controlled motion in the X and Y directions. The optical power passing through the test optical fiber 36 is monitored by an optical power meter 38 for the case of a transmitting optical subassembly (TOSA). In the case of a receiving optical subassembly (ROSA), a semiconductor laser sends power through the test optical fiber and the detector optoelectronic converter produces the signal to be monitored.

A data processing controller 39 such as a personal computer with appropriate control software provides signals to the stage controller 40 and to a low power signal generator followed by an RF amplifier collectively shown as element 41. The amplitude and frequency of the signal generator are separately externally programmable through the data processing controller 39. Typically, the RF signal is about 50 KHz and the maximum power delivered to the coil 34 is between 10 and 1000 watts, preferably of the order of 100 watts.

In this invention, housings with a very large recess (225 μm) were used so that at the "zero" position a very low value of coupling efficiency (and hence very low feedback-induced noise) was obtained. Using a software program for control, the alignment apparatus first carries out an X-Y alignment (see U.S. application Ser. No. 08/322,849) now U.S. Pat. No. 5,511,140, then gradually increases the gap between the optoelectronic converter 4 and the housing in the Z-direction until the coupling efficiency (CE) has increased to a predetermined value, at which point another X-Y alignment is carried out, followed by the usual curing procedure. In addition to the altered alignment technique, another difference between the new, three-axis procedure and the standard, two-axis procedure involves the use of more epoxy to accommodate the larger gap, and the use of a more aggressive curing procedure to crosslink the added epoxy.

Experience has shown that with the proper techniques, lateral shifts associated with the three-axis procedure were no worse than those encountered with the two-axis procedure. A substantial Z-axis shift was, however, found during epoxy cure due to the shrinkage of the epoxy. By controlling the amount of applied epoxy, this shift was found to be fairly reproducible, and could be compensated by a countervailing Z-axis displacement which was embedded in the software. Experiments show the value of this offset to be about 40 μm.

The experimental results for two groups of four TOSAs each are shown in Table 1.

TABLE 1

| OSAs Made By Pre-Specification of CE | | | | |
|---|---|---|---|---|
| TOSA No. | Desired CE (%) | After-Align CE (%) | After-Epoxy CE (%) | After-Epoxy Z GAP (μm) | After-Epoxy Feedback-induced noise (−dB/Hz) |
| 1 | 27.0 | 26.3 | 26.6 | 85 | 117 |
| 2 | 27.0 | 27.3 | 27.0 | 62 | 116 |
| 3 | 27.0 | 26.2 | 26.4 | 104 | 120 |
| 4 | 27.0 | 26.7 | 25.8 | 83 | 113 |
| 5 | 17.0 | 16.7 | 17.0 | 75 | 127 |
| 6 | 17.0 | 16.8 | 17.2 | 85 | 128 |
| 7 | 17.0 | 16.9 | 17.0 | 47 | 124 |
| 8 | 17.0 | 17.0 | 16.4 | 35 | 126 |

The preprogrammed value for the coupling efficiency (CE) in the first group was 27% which gives the expected rather high feedback-induced noise value of about −117 to −120 dB/Hz. It is seen that the program found that value of the Z-gap which gave the desired CE, at least to within about 1%. Note, however, that large TOSA-to-TOSA variations in the optimum Z-gap values are shown, presumably due to component variations, which this new procedure overcomes. A small shift in values of CE and feedback-induced noise is observed after application of the second epoxy, but his shift is not worse than obtained with the standard procedure. The preprogrammed value for the coupling efficiency (CE) in the second group of TOSAs was 17%, which gives a lower feedback-induced noise value. The results are otherwise similar in character to those of the first group.

In summary, these results show that with the new procedure the desired coupling efficiency and associated feedback-induced noise can be "dialed in" prior to fabrication by simply altering an input parameter in the software. The coupling efficiency/feedback-induced noise relationship can then be altered according to customer demand, thereby avoiding stocking extra parts. The new procedure also gives added protection against component variations by automatically compensating for them. Finally, by removing the previous constraint on the OSA design which demanded a large Z-axis tolerance from the lens, the way is opened for a lens redesign which can provide high coupling efficiency simultaneously with low feedback-induced noise.

In this invention, the Z-position of the laser source is adjustable, the Z-position of the laser being placed at its proper location with respect to the lens with an anticipated Z-axis error of ±10 microns. By doing this, the Z-axis tolerance of the radiation pattern in the neighborhood of the fiber is reduced well below what is needed. This means that designs with magnifications in the range from about 1.5 to 3 can be considered. These higher magnification designs mean that the numerical aperture of the radiation striking the fiber is reduced and there is a corresponding increase in coupling efficiency.

In order to provide a starting place for one skilled in the art in practicing the invention the following details of a preferred embodiment of the invention are provided. Referring again to FIG. 1, the unit is a Transmitting Optical Subassembly (TOSA). It will be apparent to one skilled in the art that similar specification selections are to be made for the Receiving Optical Subassembly (ROSA). The achieved coupling efficiency is about 30%. The optoelectronic converter 4 is a 780 nanometer wavelength laser hermetically sealed in a T0 metal can 25 with a transparent window 26 supported by a metal disc 18. The optical fiber 7 is of the multimode type having an outside diameter of 125 micrometers and a core 8 diameter of 50 micrometers. The housing 2 is of polyetheretherketone having a carbon fiber filling. The epoxy is a fast cure commercially available type. The lens 3 is made of a transparent material such as optical grade polyolefin. In the lens 3 design, two parameters defining two Gaussian distributions for light intensity in the image space reference plane are established. The indexes of refraction of the core 8 of the fiber 7 and of the cladding are established as 1.4674 and 1.4531, respectively, resulting in a maximum acceptance numerical aperture of approximately 0.2. Position tolerances, referred to image space, were established at ±100 μm in the Z axial direction and 16 μm in the radial direction, i.e., perpendicular to the Z-axis. The minimum coupling efficiency is set at 0.25, and is substantially held throughout the tolerance range.

What has been described is a low cost optical subassembly where the housing and the optical considerations compensate for inability to achieve and fix precise alignments when using molded plastic components. While the invention has been described in terms of the embodiments described above, those skilled in the art will recognize that the invention can be practiced with modification within the spirit and scope of the appended claims.

Having thus described our invention, what we claim as new and desire to secure by Letters patent is as follows:

1. An optical subassembly, receiving a ferrule-held optical fiber, comprising:

a packaged optoelectronic converter, said packaged optoelectronic converter comprising an optoelectronic converter mounted within a cylindrical can mounted on a disk-shaped support;

a housing having a ferrule bore in a first end of said housing to receive said ferrule-held optical fiber, a converter bore in a second, opposite end of said housing to receive said disk-shaped support of said packaged optoelectronic converter, and a lens bore having a smaller diameter than said converter bore, said lens bore communicating between said ferrule bore and said converter bore and into which said cylindrical can of said packaged optoelectronic converter projects, said ferrule bore, converter bore and lens bore having a common axis, said ferrule-held optical fiber and said packaged optoelectronic converter being spatially separated within said housing along said common axis;

a lens made of an optical grade material that is transparent over a range of wavelengths of an optical signal transmitted between said ferrule-held optical fiber and said optoelectronic converter, said lens being positioned in said lens bore of said housing between said ferrule-held optical fiber and said packaged optoelectronic converter on said common axis; and an adhesive layer contained within said converter bore that attaches said disk-shaped support to said second end of said housing and into which said packaged optoelectronic converter is disposed.

2. The optical subassembly of claim 1 wherein said adhesive layer has a thickness which preserves alignment of said packaged optoelectronic converter in a direction along said common axis.

3. The optical subassembly of claim 2 wherein said adhesive layer is a cured epoxy resin.

4. The optical subassembly of claim 2 wherein said optoelectronic converter is a solid-state laser.

5. The optical subassembly of claim 2 wherein said optoelectronic converter is a solid-state photodetector.

6. The optical subassembly of claim 2 wherein said ferrule-held optical fiber is a friction fit within said ferrule bore.

7. The optical subassembly of claim 1 wherein said lens is held in said lens bore by staking some material of said housing against said lens.

8. A method of aligning and fixing in place a packaged optoelectronic converter within a housing, said housing receiving a ferrule-held optical fiber in a ferrule bore and having a lens mounted within a lens bore communicating with said ferrule bore, said lens and said ferrule-held optical fiber being on a common optical axis, said method comprising the steps of:

providing a converter bore communicating with said lens bore in said housing, said converter bore having a larger diameter than said lens bore, said packaged optoelectronic converter comprising an optoelectronic converter mounted within a cylindrical can mounted on a disk-shaped support, said cylindrical can projecting within said lens bore and said disk-shaped support being received within said converter bore, the diameter of said converter bore being larger than a diameter of said disk-shaped support to allow a range of motion of the packaged optoelectronic converter in two directions perpendicular to said common optical axis and having a depth allowing a limited range of motion in a third direction along said common optical axis;

providing a position fixing adhesive while in its compliant state in a space between said disk-shaped support of the packaged optoelectronic converter and a shoulder formed by the interface of said lens and converter bores;

moving said packaged optoelectronic within said converter bore, according to an optimization prescription, while monitoring the power level of an optical signal transmitted between said optoelectronic converter and said optical fiber, the movement experienced by said packaged optoelectronic converter being in two directions perpendicular to said common optical axis and in the direction along said common optical axis;

selecting a position within said converter bore such that said power level of the optical signal is within prescribed limits, partially curing said adhesive by the application of heat, remeasuring said power level to determine whether or not there has been a substantial change in the said power level, and if so, moving again said packaged optoelectronic converter within said converter bore according to an optimizing process in order to bring said power level within said prescribed limits; and repeating the curing and remeasuring steps until said adhesive reaches a sufficiently cured state.

9. The method of claim 8 wherein each direction of motion of said packaged optoelectronic converter is limited to approximately ±0.2 mm.

10. The method of claim 8 wherein said adhesive is an epoxy resin.

11. The method of claim 10 wherein the partial curing of said epoxy resin by said application of heat is accomplished by inductively heating, using an radio frequency (RF) field.

12. The optical subassembly of claim 1 wherein said housing comprises a plastic material.

13. The optical subassembly of claim 12 wherein said plastic material comprises a fiber-filled plastic material selected from the group consisting of poly(aryletherketone) and poly(benzoatephthalate).

14. The optical subassembly of claim 12 wherein said fiber-filled plastic material is filled with carbon fibers.

15. The optical subassembly of claim 1 wherein said disk-shaped support comprises a material having radio frequency (RF) susceptibility.

16. The method of claim 11 wherein said inductively heating is accomplished by inductively coupling radio frequency (RF) power into said optoelectronic converter package through said disk-shaped support.

* * * * *